United States Patent
Sloan et al.

(10) Patent No.: US 10,369,884 B2
(45) Date of Patent: Aug. 6, 2019

(54) TAILGATE FUEL SYSTEM MOUNTING SYSTEM

(71) Applicant: Agility Fuel Systems LLC, Costa Mesa, CA (US)

(72) Inventors: Todd F. Sloan, Kelowna (CA); Chris Forsberg, Kelowna (CA); David Cate, Nashville, TN (US)

(73) Assignee: Agility Fuel Systems LLC, Costa Mesa, CA (US)

( * ) Notice: Subject to any disclaimer, the term of this patent is extended or adjusted under 35 U.S.C. 154(b) by 0 days.

(21) Appl. No.: 15/851,416

(22) Filed: Dec. 21, 2017

(65) Prior Publication Data

US 2018/0111477 A1    Apr. 26, 2018

Related U.S. Application Data

(63) Continuation of application No. PCT/US2016/039363, filed on Jun. 24, 2016.
(Continued)

(51) Int. Cl.
*B60K 15/073* (2006.01)
*B60K 15/067* (2006.01)
(Continued)

(52) U.S. Cl.
CPC ...... *B60K 15/073* (2013.01); *B60K 15/03006* (2013.01); *B60K 15/067* (2013.01);
(Continued)

(58) Field of Classification Search
CPC ............ B60K 15/01–013; B60K 15/03; B60K 15/03006; B60K 15/03118;
(Continued)

(56) References Cited

U.S. PATENT DOCUMENTS 1,598,868 A * 9/1926 Lundelius .............. B62D 25/12
16/335
5,136,752 A * 8/1992 Bening .................. B62D 25/10
16/287
(Continued)

FOREIGN PATENT DOCUMENTS

EP    2130747 A2    12/2009
EP    2165875 A2    3/2010
(Continued)

OTHER PUBLICATIONS

International Search Report and Written Opinion issued in PCT Application No. PCT/US2016/039363, dated Sep. 16, 2016, in 15 pages.
(Continued)

*Primary Examiner* — Erez Gurari
(74) *Attorney, Agent, or Firm* — Knobbe Martens Olson & Bear, LLP

(57) ABSTRACT

An assembly bracket system is provided. The system includes a first bracket portion and a second bracket portion. The first bracket portion is configured to be attached to a vehicle tailgate. The second bracket portion is configured to be attached to a vehicle fuel system. The first bracket portion and the second bracket portion are configured to be engaged to each other in a manner that limits at least one degree of freedom of the vehicle fuel system relative to the vehicle tailgate while allowing pivoting of the second bracket portion relative to the first bracket portion.

10 Claims, 10 Drawing Sheets

Related U.S. Application Data

(60) Provisional application No. 62/184,710, filed on Jun. 25, 2015.

(51) Int. Cl.
  *B65F 3/00* (2006.01)
  *B65F 3/24* (2006.01)
  *B60K 15/03* (2006.01)
  *B60K 15/07* (2006.01)
  *B60K 15/063* (2006.01)

(52) U.S. Cl.
  CPC .............. *B60K 15/07* (2013.01); *B65F 3/00* (2013.01); *B65F 3/24* (2013.01); *B60K 2015/03309* (2013.01); *B60K 2015/0638* (2013.01); *B60Y 2200/142* (2013.01); *B60Y 2200/144* (2013.01)

(58) Field of Classification Search
  CPC ........ B60K 15/03125; B60K 15/03114; B60K 15/03328; B60K 15/06; B60K 15/063; B60K 15/0638; B60K 15/067; B60K 15/07
  See application file for complete search history.

(56) References Cited

U.S. PATENT DOCUMENTS

| | | | | |
|---|---|---|---|---|
| 5,527,098 A * | 6/1996 | McKinney | ............... | B60J 5/108 296/56 |
| 6,053,533 A | 4/2000 | Osborn et al. | | |
| 6,347,678 B1 | 2/2002 | Osborn et al. | | |
| 6,402,198 B2 * | 6/2002 | Gollungberg | ........ | B60K 15/067 280/830 |
| 6,481,751 B1 * | 11/2002 | Davis, Jr. | ......... | B60K 15/03006 180/69.5 |
| 6,843,237 B2 | 1/2005 | Bowen et al. | | |
| 6,896,318 B2 * | 5/2005 | Marrs | .................... | B62D 27/02 280/833 |
| 7,137,474 B2 * | 11/2006 | Yokote | ................ | F17C 13/084 180/314 |
| 7,189,040 B2 * | 3/2007 | Sharp | .................... | B60K 15/07 410/42 |
| 7,270,209 B2 * | 9/2007 | Suess | ............... | B60K 15/03006 180/69.5 |
| 7,984,925 B2 * | 7/2011 | Levin | ................... | B60K 15/067 105/358 |
| 8,381,955 B2 | 2/2013 | Grater et al. | | |
| 8,905,170 B2 | 12/2014 | Kyoden et al. | | |
| 9,061,584 B2 | 6/2015 | Vargo et al. | | |
| 9,120,372 B2 | 9/2015 | Sloan et al. | | |
| 9,227,582 B2 * | 1/2016 | Katayama | ................ | B60K 1/04 |
| 9,457,652 B2 | 10/2016 | Sloan et al. | | |
| 10,017,037 B2 | 6/2018 | Newman et al. | | |
| 10,144,280 B2 | 12/2018 | Sloan et al. | | |
| 2009/0114784 A1 * | 5/2009 | Tam | ..................... | B60K 15/067 248/205.1 |
| 2011/0233353 A1 | 9/2011 | Palmer | | |
| 2013/0001384 A1 * | 1/2013 | Karlsson | .............. | B60K 15/067 248/214 |
| 2013/0199863 A1 * | 8/2013 | Robbins | ............... | B60K 15/063 180/69.4 |
| 2013/0334381 A1 | 12/2013 | Vargo et al. | | |
| 2014/0137953 A1 * | 5/2014 | Gibb | ......................... | F17C 1/00 137/351 |
| 2014/0175782 A1 | 6/2014 | Sloan et al. | | |
| 2014/0175783 A1 | 6/2014 | Sloan et al. | | |
| 2014/0367954 A1 * | 12/2014 | McKinney | ................ | B65F 3/00 280/834 |
| 2015/0175353 A1 * | 6/2015 | Gillmore | ................... | B65F 3/00 414/472 |
| 2016/0023548 A1 * | 1/2016 | Crist | ................ | B60K 15/03006 180/271 |
| 2017/0334288 A1 * | 11/2017 | Rike | ...................... | B60K 15/07 |
| 2018/0111477 A1 * | 4/2018 | Sloan | ................... | B60K 15/067 |
| 2018/0257580 A1 * | 9/2018 | Sloan | ................... | B60K 15/063 |
| 2018/0283610 A1 * | 10/2018 | Wexler | ...................... | F17C 1/06 |

FOREIGN PATENT DOCUMENTS

| | | |
|---|---|---|
| JP | H-11278069 A | 10/1999 |
| JP | 2005-138771 A | 6/2005 |
| JP | 2009-220680 A | 10/2009 |
| JP | 2010-100207 A | 5/2010 |
| WO | WO 2007/133213 A1 | 11/2007 |
| WO | WO 2012/115622 A1 | 8/2012 |
| WO | WO 2016/210329 | 12/2016 |

OTHER PUBLICATIONS

European Search Report issued in European Application No. 16815425.0, dated Mar. 14, 2019, in 4 pages.

* cited by examiner

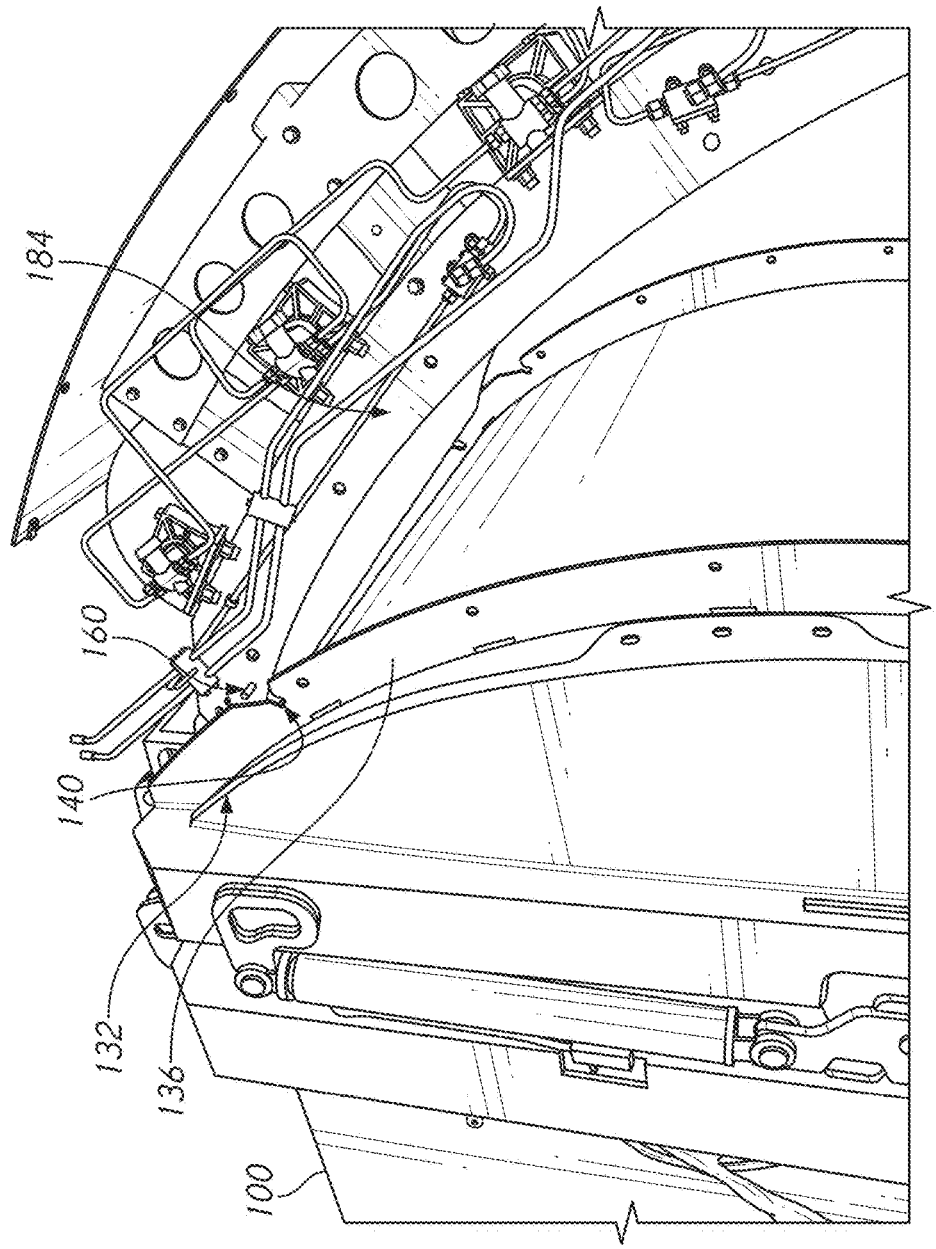

TAILGATE FUEL SYSTEM MOUNTING SYSTEM

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 C.F.R. § 1.57.

BACKGROUND OF THE INVENTION

Field of the Invention

This application relates to structures for mounting a fuel system to a tailgate of a vehicle, such as for mounting a compressed natural gas (CNG) fuel system to a refuse or other heavy duty truck.

Description of the Related Art

It is known to power heavy duty vehicles with CNG fuel systems. Such systems can be mounted to the vehicle in a variety of ways. The most common mounting location for a refuse truck CNG fuel system is the rooftop. A structural support including a frame or a bracket connects the fuel system to the chassis of the truck, usually at a location above the garbage retaining shell. This location offers some benefits, but can make the truck too tall for the required clearance height in certain circumstances.

Another concern with connecting a fuel system to a truck is the process by which the fuel system is positioned relative to the truck during assembly. Because the fuel assembly can include a number of tanks and associated plumbing, the fuel system is very large and heavy. As a result, a crane is needed to raise the fuel system to be close to the desired mounting location. Further, the system must be carefully aligned with the truck to enable it to be connected to the vehicle, typically allowing a number of bolts to be threaded through holes.

SUMMARY OF THE INVENTION

In view of the shortcomings of the prior art, it would be advantageous to enable convenient mounting of a fuel system in an alternative location. It would be advantageous to reduce the difficulty of connecting the fuel system to the vehicle despite the awkwardness of this process arising out of the awkward size and shape of the fuel system.

In one embodiment, an apparatus is provide that includes a fuel system and a mounting structure. The fuel system includes at least one fuel tank, a conduit for providing fluid communication between the fuel tank and an engine of a vehicle, and a support frame coupled with the fuel tank and the conduit. The support frame supports the fuel tank and the conduit. The mounting structure is configured to couple with a tailgate of a refuse truck. The mounting structure includes a bracket having a concave portion. The concave portion has an open portion and a closed portion. In some embodiments, the open portion can be disposed above the closed portion. In some embodiments, the open portion can be disposed below the closed portion. The mounting structure also has a connection feature coupled with the support frame. The connection feature is configured such the connection feature can be lowered into the concave portion of the bracket. The connection feature enable the fuel system to pivot about an axis thereof to cause the support frame to be aligned with the bracket of the mounting structure. When so aligned, apertures in the bracket and support frame are disposed about a common axis.

In another embodiment, a heavy duty refuse vehicle is provided. The vehicle includes an engine, a shell for containing refuse, a tailgate, and a fuel system. The fuel pod includes at least one fuel tank, a conduit for providing fluid communication between the fuel tank and the engine, and a support frame coupled with and supporting the fuel tank and the conduit. The vehicle also includes a bracket coupled with the tailgate and a system having a concave portion that has an open portion and a closed portion. In some embodiments, the system can be implemented as a drop and go system. The concave portion is disposed on one of the brackets and the support frame of the fuel pod. A lateral rod is disposed on the other of the bracket and the support frame. The fuel pod can be coupled with the tailgate by advancing the lateral rod through the open end of the concave portion and into the closed end thereof as the fuel pod and the tailgate move toward each other.

In another embodiment, an assembly bracket system is provided. The system includes a first bracket portion and a second bracket portion. The first bracket portion is configured to be attached to a vehicle tailgate. The second bracket portion is configured to be attached to a vehicle fuel system. The first bracket portion and the second bracket portion are configured to be engaged to each other in a manner that limits at least one degree of freedom of the vehicle fuel system relative to the vehicle tailgate while allowing pivoting of the second bracket portion relative to the first bracket portion.

BRIEF DESCRIPTION OF THE DRAWINGS

Various embodiments are depicted in the accompanying drawings for illustrative purposes, and should in no way be interpreted as limiting the scope of the embodiments. Furthermore, various features of different disclosed embodiments can be combined to form additional embodiments, which are part of this disclosure.

FIG. 3 is a rear perspective view the fuel system pod being positioned above a fuel system mounting structure;

DETAILED DESCRIPTION OF THE PREFERRED EMBODIMENT

This application is directed to novel approaches for connecting a fuel system pod to a refuse vehicle. The fuel system pod described herein can be connected to any vehicle, including the refuse vehicle, rear-loading vehicle, and/or side-loading vehicle, among other heavy-duty vehicles. A fuel system pod is an assembly including fuel tanks, plumbing to convey fuel into and/or out of the tanks, and associated components. As discussed further below, an advance over the prior art would enable a quick and low labor initial and temporary coupling of the fuel system pod with the refuse truck that facilitates full assembly of these components using suitable fasteners.

Figure 1:
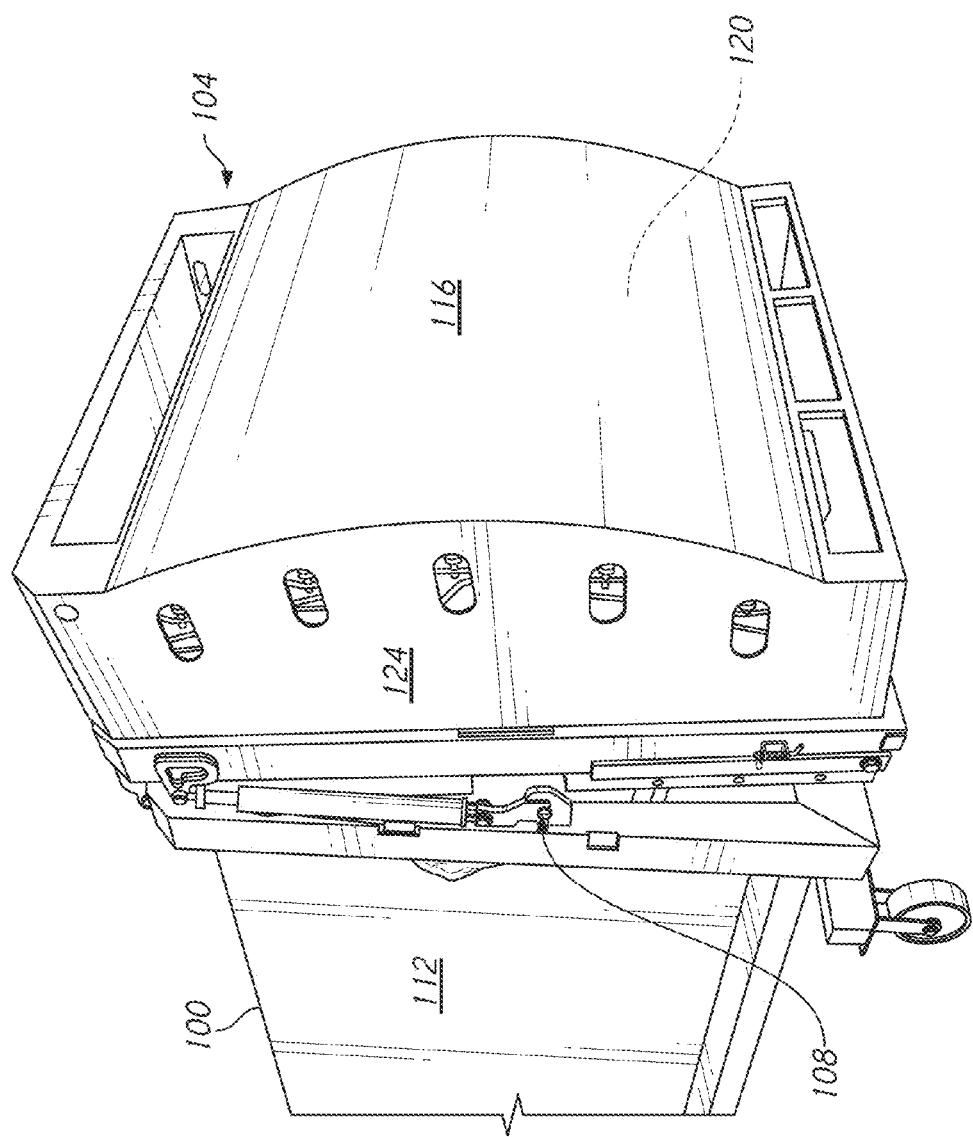
FIG. 1 is a rear perspective view of a truck having an inventive fuel system mounting system.

FIG. 1 shows a rear perspective view of a refuse vehicle 100 having a fuel system 104 mounted to a tailgate 108 thereof. The refuse vehicle 100 can have many different configurations. In some embodiments, the refuse vehicle 100 includes a front cab area and a front loading configuration. In the front loading configuration, the refuse vehicle has a mechanical arm that can be lowered or extended forwardly to engage a dumpster or other large trash bin located in the front of the cab. The vehicle also has an opening placed at one end of the range of motion of the arm such that when retracted the arm deposits the contents of the trash bin into a hollow shell 112 of the vehicle. The tailgate 108 provides occasional access to the inside of a hollow shell 112, which retains the collected trash during the regular route. The vehicle 100 may also have an auger or other compactor that maximizes the useful volume of the shell 112 during the route by forcing the refuse into a smaller volume. The vehicle 100 has a fuel pod 120, which comprises a separable portion of a fuel system of the vehicle 100. The fuel pod 120 is mounted to the tailgate 108 as shown in FIG. 1. This application discloses mounting systems that make the connection of the fuel pod 120 to the tailgate 108 much more convenient.

An advantage of placing the fuel system on the tailgate is that the weight of the vehicle 100 is better balanced between front and rear axles of the vehicle 100. In the case of a front loader, during use heavy loads are principally carried by the front axle. These loads are from the weight of the engine and from the weight of the trash bins and their contents that are hoisted over the truck. By placing the fuel pod 120 on the tailgate 108 a significant load is shifted to the rear axle or axles.

Figure 7:
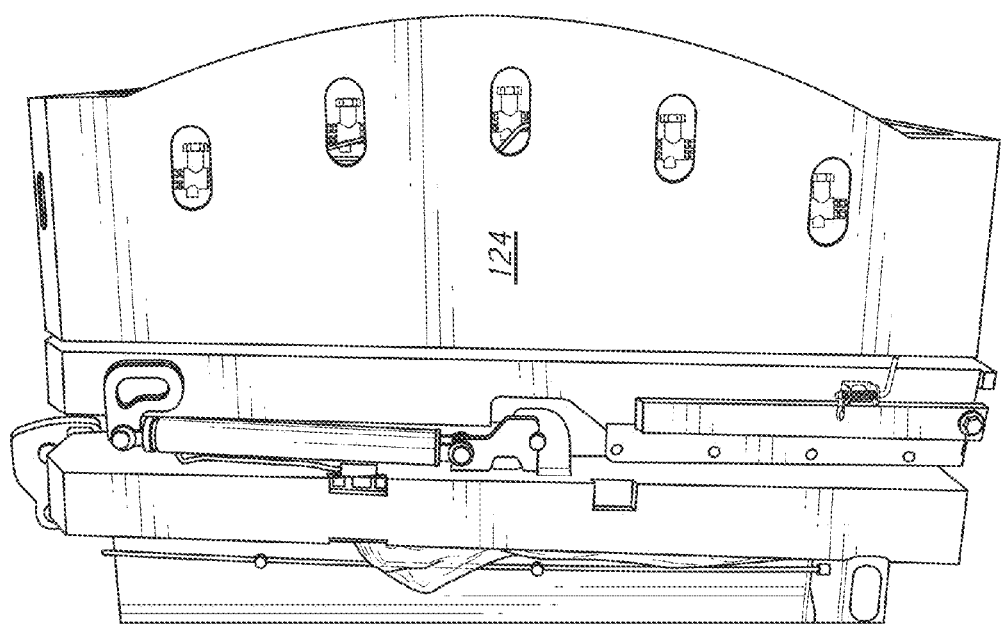
FIG. 7 shows the fuel system pod with a cover disposed over a side portion thereof.

A cover is coupled with the tailgate 108 and disposed around and at least partially encloses a fuel pod 120. The cover can include a rear portion 116 that shrouds the back of the fuel system 104 and one or more side portions 124 that generally cover but allow access to tanks, valves, fuel system conduit, and other components disposed on the side portion of the fuel system 104. In some embodiments, the fuel system conduit, among other components can provide fluid communication between the fuel tanks and an engine of the vehicle 100. In some embodiments, the fuel system 104 can include a support frame coupled with the fuel tanks. The support frame can support a fuel pressure vessel, sometimes referred to herein as a fuel tank, and/or the conduit, among other components. In some embodiments, the support frame can include a second bracket, as discussed in more detail below. FIG. 7 shows the fuel system 104 in a secured position with the cover disposed over the one or more side portions 124.

Figure 2:
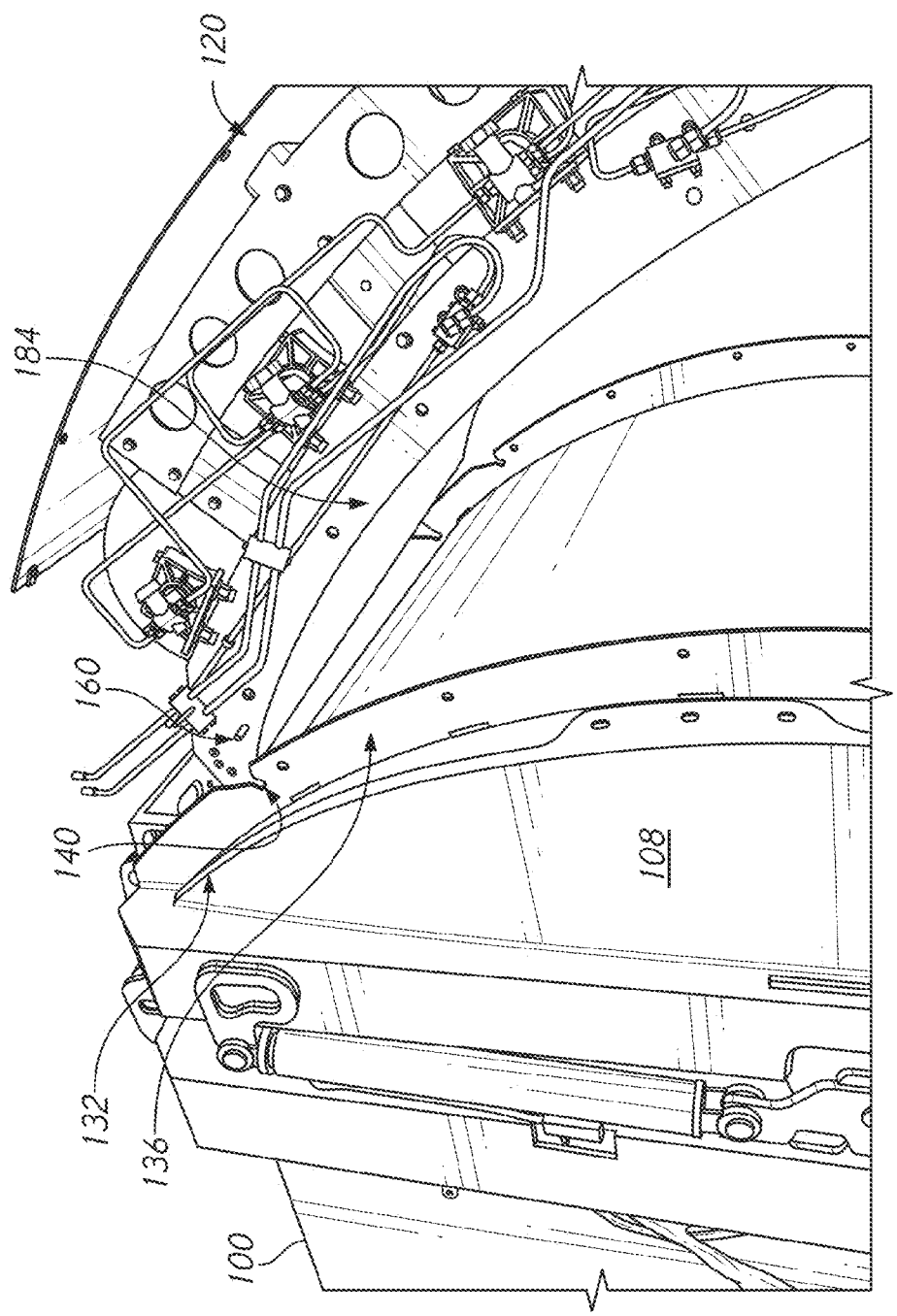
FIG. 2 is a rear perspective view a fuel system pod being suspended by a crane during assembly of the fuel system pod to a tailgate of the truck.
Figure 4:
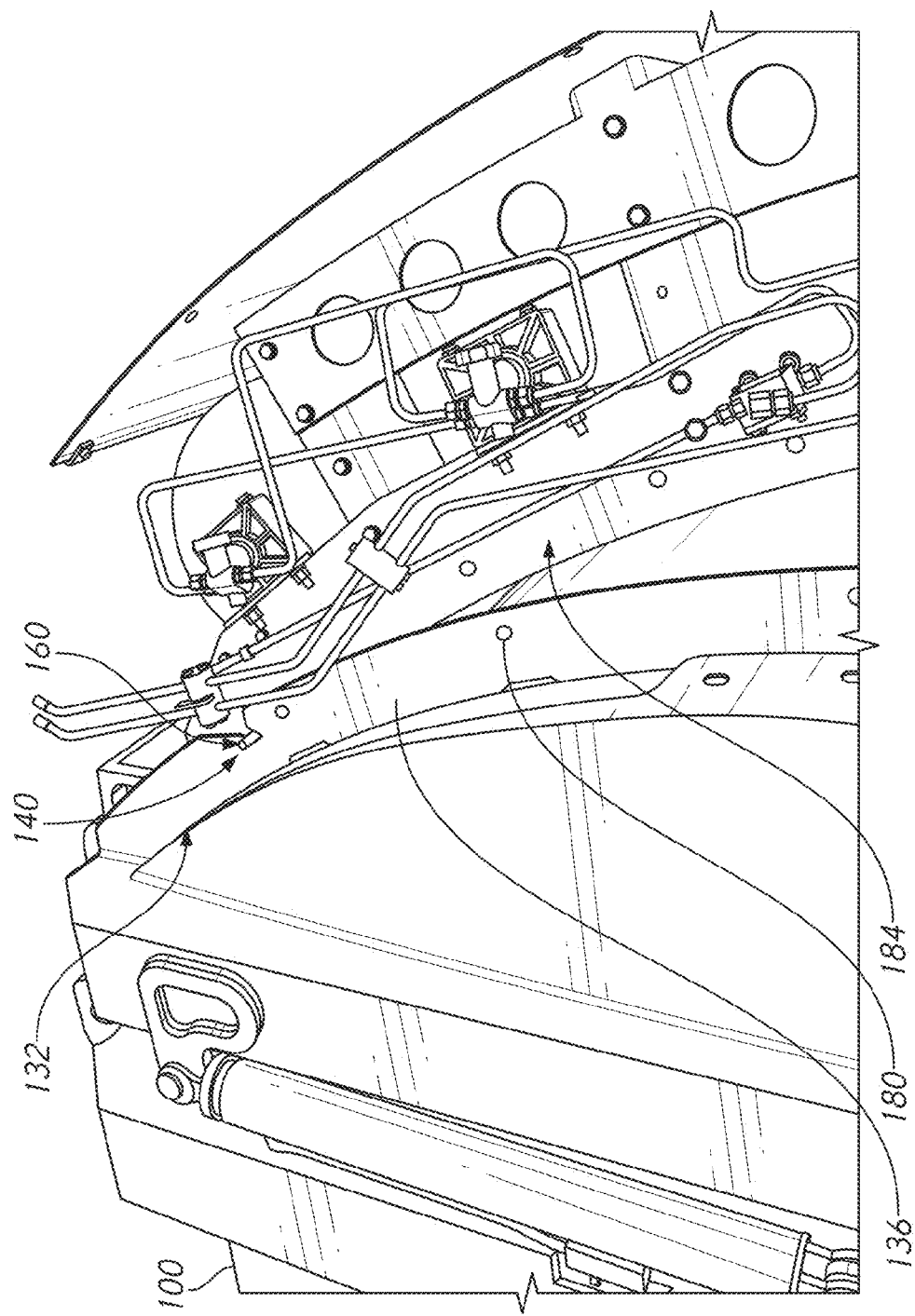
FIG. 4 is a rear perspective view the fuel system pod engaged with the fuel system mounting structure.

FIGS. 2-4 show a mounting structure 132 that facilitates connecting the fuel pod 120 to the vehicle 100. In one embodiment, the mounting structure 132 includes a bracket 136 coupled with the tailgate 108. The bracket 136 can be a first bracket portion of an assembly bracket system, as discussed further below. The bracket 136 can be coupled in any suitable manner, such as by being welded to a rear surface of the tailgate 108. The bracket 136 has a concave feature 140 that is configured to connect with a connection feature 160 of the fuel pod 120. The concave feature 140 can be configured to receive a portion of the mounting structure 132. In one embodiment the concave feature 140 includes a groove, e.g., a downwardly extending groove.

Figure 2A:
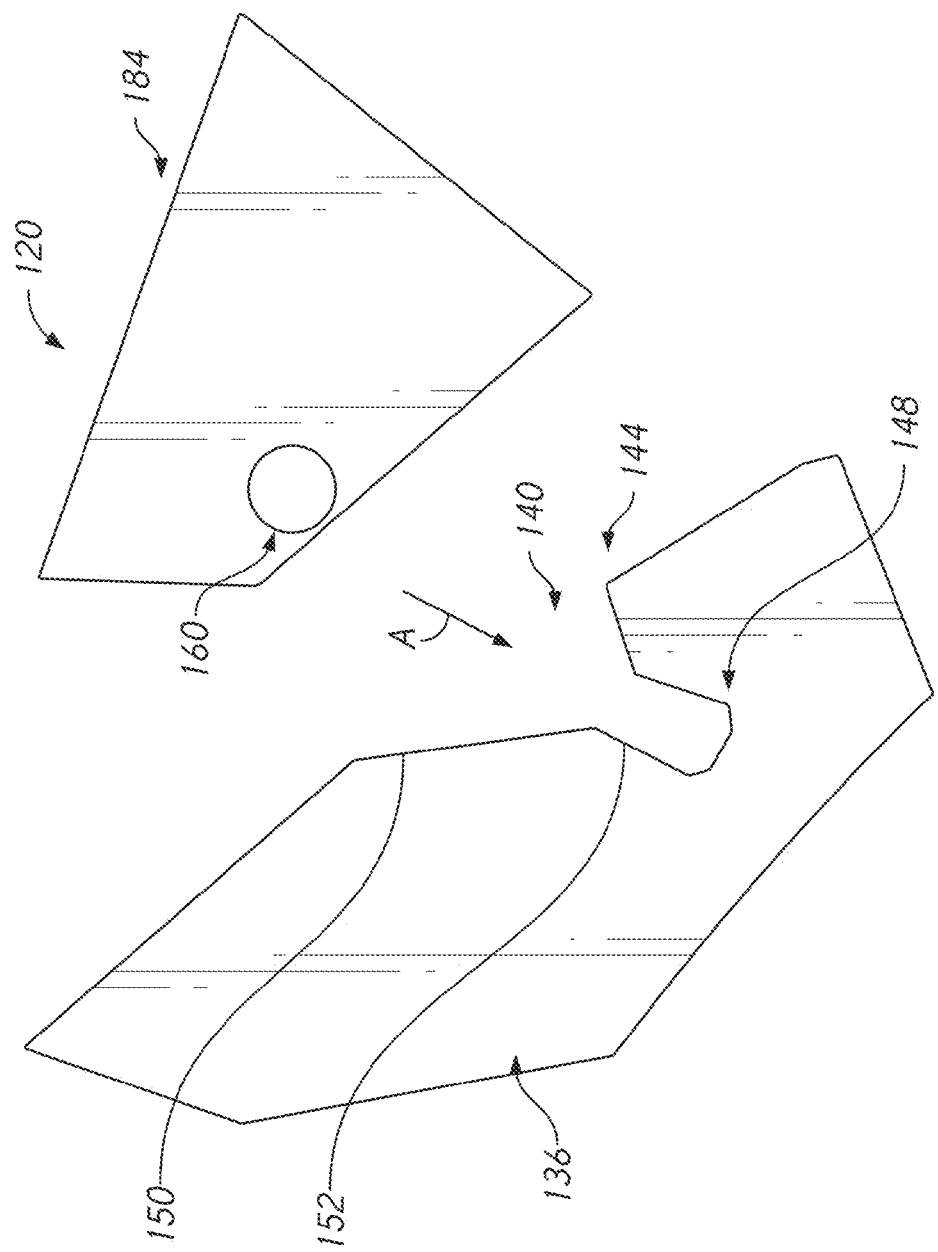
FIG. 2A is a schematic view of a mounting system bracket and retention member system provided in some embodiments.

FIG. 2A shows that in one embodiment the concave feature 140 is open toward a top portion 144 thereof and enclosed toward a bottom portion 148. The concave feature 140 also has a narrowing zone 150 disposed between the top and bottom portions 144, 148. A slot 152 is provided between the narrowing zone 150 and the bottom portion 148 of the concave feature 140. The narrowing zone 150 can be disposed at an elevation above the slot 152. The narrowing zone 150 can have a funnel shape or other configuration that acts to guide the connection feature 160 into the slot 152. The narrowing zone 150 can have a width that decreases from the open upper portion towards the slot. The slot 152 provides temporary retention of the position of the fuel pod 120 relative to the tailgate 108 as discussed further below. The motion of the connection feature 160 into the concave feature 140 is illustrated by the arrow A in FIG. 2A and is shown by the progression of FIGS. 2, 3, and 4. In one technique, the fuel pod 120 is suspended by a crane and slowly lowered until the connection feature 160 is disposed in the slot 152. Minor misalignment of the connection feature 160 and the slot 152 is corrected by the narrowing zone 150 as the fuel pod 120 is lowered from the position of FIG. 3 to the position of FIG. 4.

The connection feature 160 can be disposed on the fuel pod 120 and can be adapted to engage the bracket 136. In some embodiments, the connection feature 160 can be disposed on a second bracket portion 184 of the fuel pod 120, as discussed in more detail below. The connection feature 160 can be configured as a lateral rod that has a diameter less than the width of the slot 152. In some embodiments, the slot 152 can have a lateral dimension that is larger than the diameter of the connection feature 160. The diameter of the connection feature 152 can be large enough to support the weight of the fuel pod 120 for a short time in some embodiments. In other embodiments, the connection feature 160 is provided just to guide the fuel pod 120 into position for full securement, as discussed below.

Figure 2B:
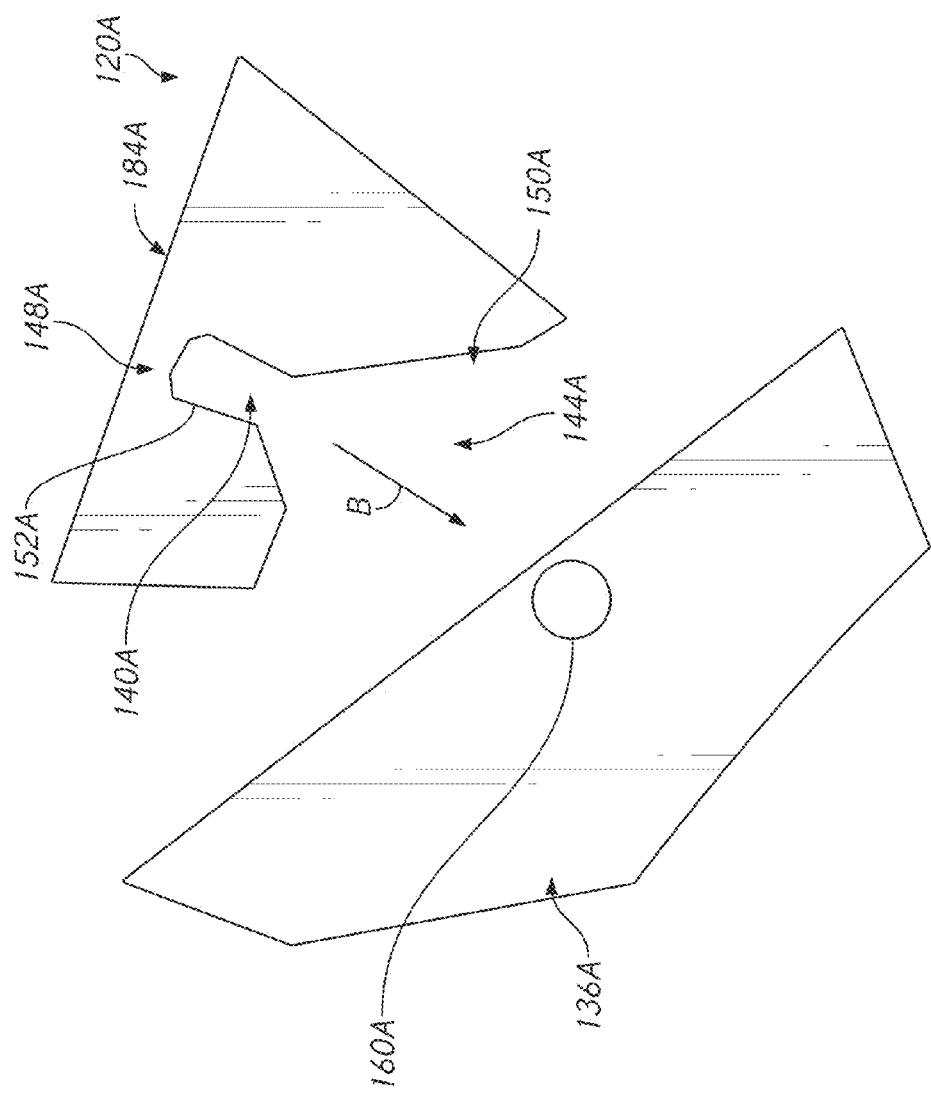
FIG. 2B is a schematic view of a mounting system bracket and retention member system provided in some embodiments.

FIG. 2B shows that in one embodiment, a second bracket portion 184A, as discussed in more detail below, can include a concave feature 140A. In some embodiments, the bracket 136 of the mounting structure can include a connection feature 160A. The concave feature 140A and the connection feature 160A can have many of the same or similar features as the concave feature 140 and connection feature 160, respectively. For example, the concave feature 140A can include an open portion 144A and an enclosed portion 148A. The open portion 144A can be disposed below the enclosed portion 148A. The concave feature 140A also has a narrowing zone 150A disposed between the open and closed portions 144A, 148A. A slot 152A is provided between the narrowing zone 150A and the closed portion 148A of the concave feature 140A. The narrowing zone 150A can have a funnel shape or other configuration that acts to guide a connection feature 160A of the mounting structure into the slot 152. The slot 152A can provide temporary retention of the position of the fuel pod 120 relative to the tailgate 108. In some embodiments, the concave feature 140A can provide additional support to retain the fuel pod 120 relative to the tailgate 108. As illustrated by the arrow B in FIG. 2B, the concave feature 140A can be lowered until the connection feature 160A is disposed within the slot 152A.

The connection feature 160A can be disposed on the bracket 136A and can be adapted to engage the second bracket 184A of the fuel pod 120A. The connection feature 160A can be configured as a pin and/or a cylindrical rod that extends laterally. The rod can have a diameter less than the width of the slot 152A. The diameter of the connection feature 152A can be large enough to support the weight of the fuel pod 120A for a short time in some embodiments. In other embodiments, the connection feature 160A is provided just to guide the fuel pod 120A into position for full securement.

Figure 6:
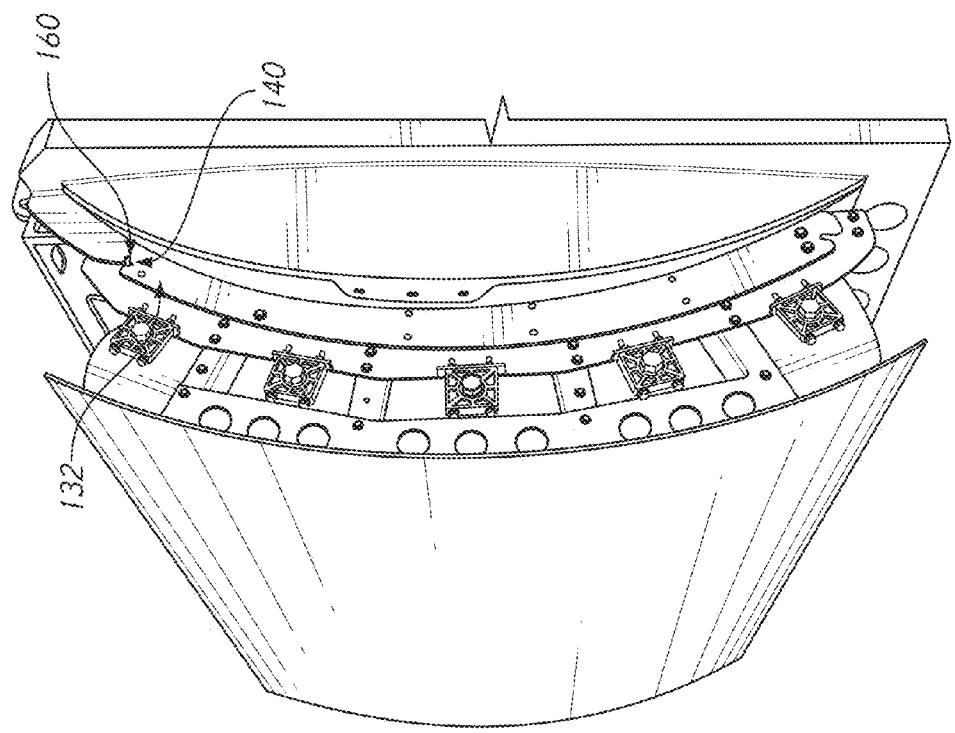
FIG. 6 is a rear perspective view of the truck from a side of the truck opposite of that shown in FIG. 4, with the fuel system mounting structure secured and one of a plurality of fasteners coupled with the fuel system pod and the truck.

FIG. 6 shows that in one embodiment, each side of the vehicle 100 can have a mounting structure 132. In some embodiments, only one side of the vehicle 100 has a mounting structure 132.

Figure 5:
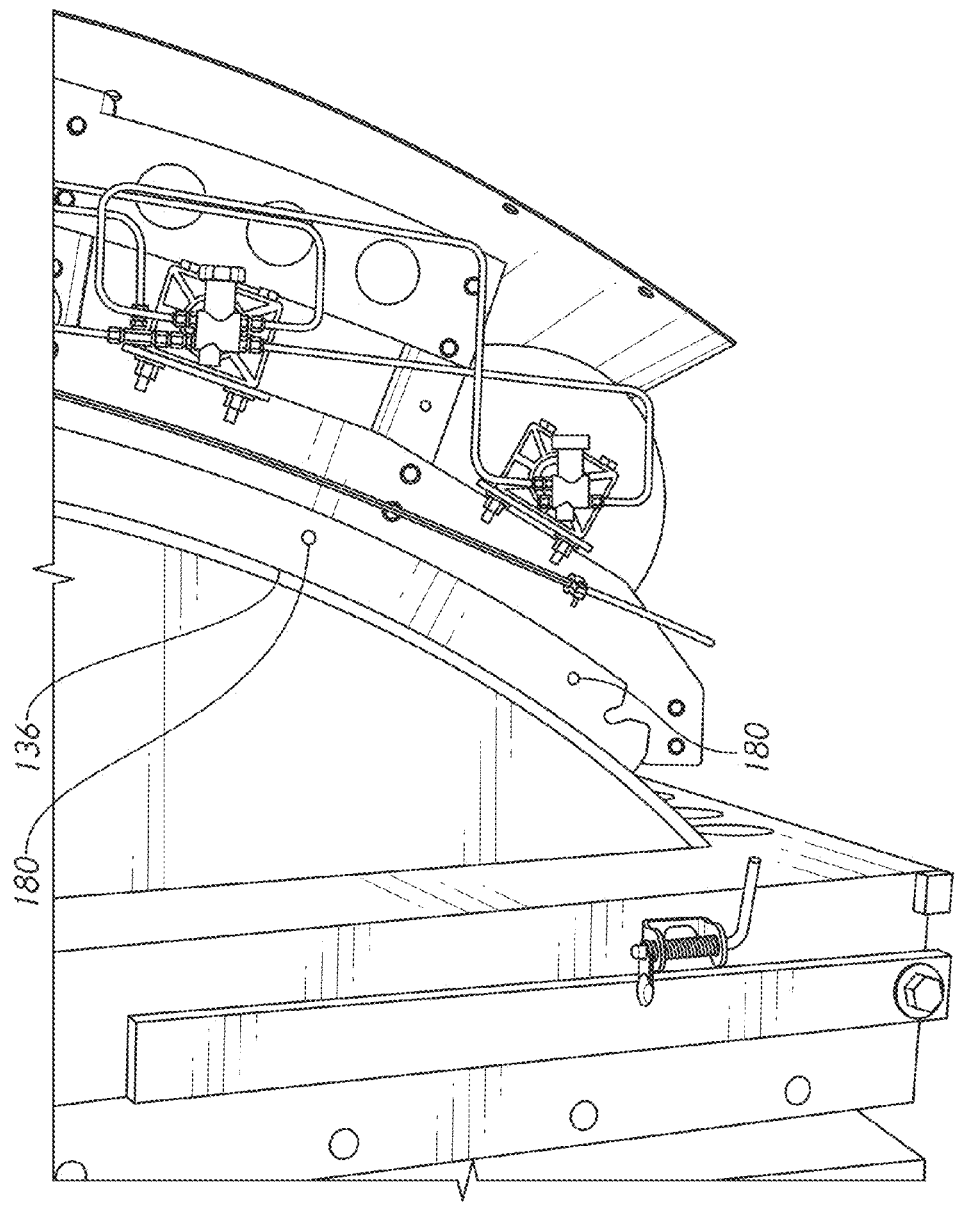
FIG. 5 is a bottom perspective view showing a fuel system bracket and a vehicle bracket, the fuel system and vehicle brackets being aligned such that the fuel system pod can be quickly secured to the truck.

FIG. 5 shows a position in with the mounting structure 132 is engaged and the fuel pod 120 has been lowered compared to the position of FIG. 4. The mounting structure 132 is configured such that as the fuel pod 120 is lowered, each of holes and/or apertures 180 of a plurality of or an array of holes and/or apertures 180 on the bracket 136 comes into alignment with a corresponding hole on a bracket 184 of the fuel pod 120 such that the bracket 136 and bracket 184 share a common axis. The bracket 184 can be a second bracket portion of an assembly bracket system and/or a support frame of the fuel system 104 as discussed further herein. The alignment of the holes 180 with the holes on the bracket of the holes on the bracket 184 can be gradually achieved by lowering the fuel pod 120. In certain embodiments, the engagement of the closed concave feature 140 and the connection feature 160, in the form of a pin, retains at least one degree of freedom of motion of the fuel pod 120 relative to a chassis of the vehicle. For example, the motion of the fuel pod 120 can be limited pivoting. More specifically, lowering the lower end of the fuel pod 120 can result in pivoting of the connection feature 160 at the bottom portion 148 of the mounting structure 132. In some embodiments, the lowering the lower end of the fuel pod 120 can result in pivoting of the fuel system relative to the support frame. The pivoting can cause the support frame of the fuel system 104 to be aligned with the bracket of the mounting structure. In some embodiments, the bracket 136 and the bracket 184 are configured to be engaged in a manner that limits at least one degree of freedom of the vehicle fuel system relative to the vehicle tailgate while allowing pivoting of the bracket 184 relative to the bracket 136.

Once alignment is achieved, bolts or other fasteners can be inserted through the holes 180 and through the bracket 184 to secure the fuel pod 120 to the tailgate 108. In certain embodiments, the bracket 136 contacts a surface of the tailgate 108 by virtue of being welded to the tailgate. In certain embodiments, a free end of the bracket 184 contacts the same and/or an external surface of the tailgate 108 when the fuel pod 120 is fully pivoted to a position of alignment. Stated another way, the tailgate 108 provides a positive stop at which the arrays of holes 180 and a corresponding array of holes on the bracket 184 are aligned.

In other embodiments, the mounting structure 132 is disposed in a structure other than the bracket 136. For example, the bracket 136 is illustrated as a continuous member that extends from a top portion of the tailgate (as in FIGS. 2, 3, and 4) to a bottom portion of the tailgate (as in FIG. 5). In other embodiments other structures can be provided. For example, the concave feature of the mounting structure 132 can be disposed on a supporting member, such as a plate or mounting block that is separate from a structure for securing the fuel pod 120. A separate member can be provided for bolting or otherwise securing the fuel pod 120 to the tailgate 108. A series of plates properly positioned could be provided for example, such that when the fuel pod 120 is lowered and pivoted into position mounting holes on the separate plates are aligned.

Figure 8:
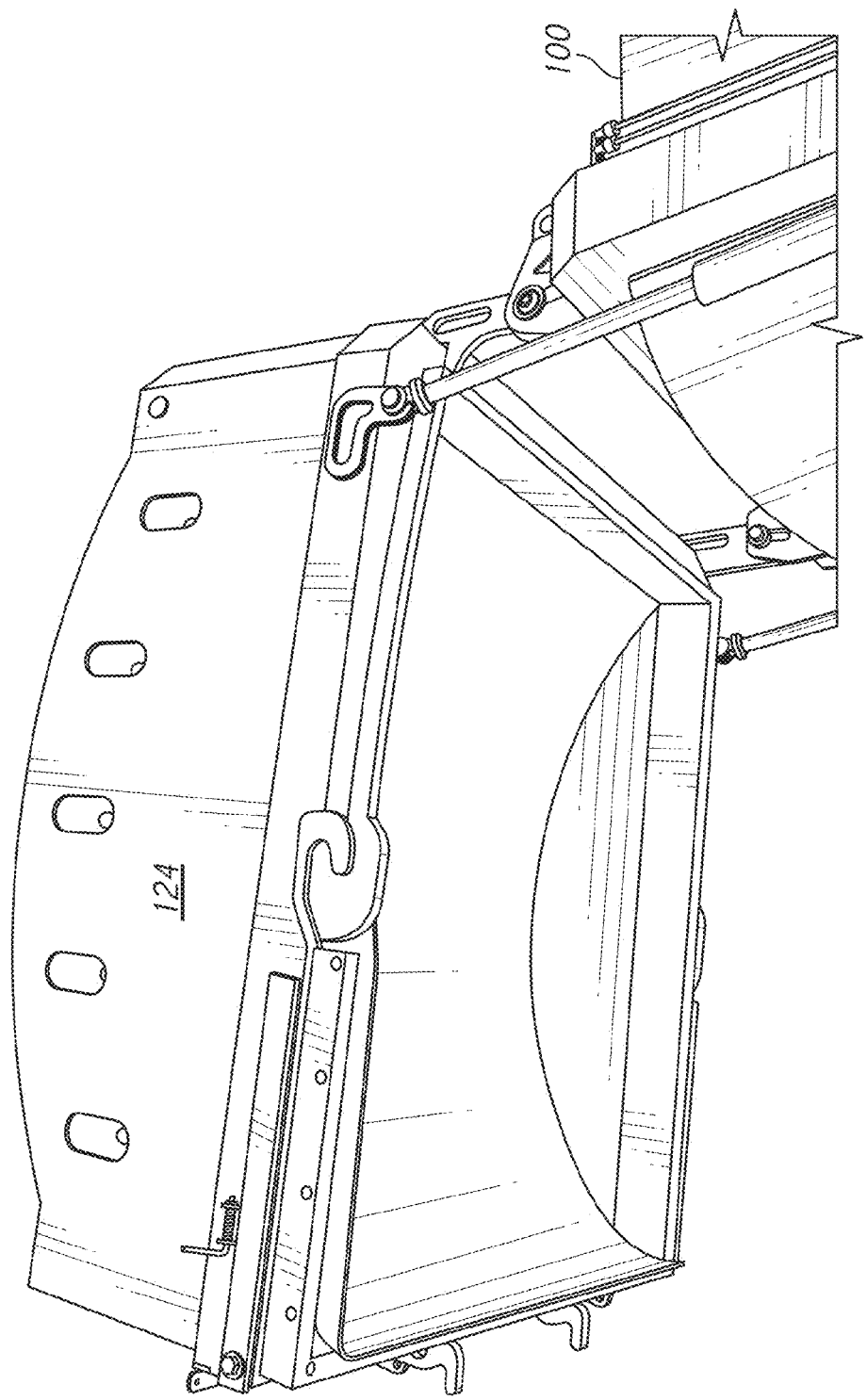
FIG. 8 illustrates the fuel system pod and cover elevated by the tailgate of the truck, showing that the fuel system is securely held by the mounting system.

FIG. 8 shows that the connection between the fuel pod 120 and the tailgate 108 is secure. The position of FIG. 8 elevates the portion of the fuel pod 120 that is at the bottom when the tailgate 108 is in a closed position above the portion of the fuel pod 120 that is at the top when the tailgate 108 is in the closed position. This elevation alters the load on the mounting structure 132 and on the fasteners that traverse the brackets 136, 184. The connection between the fuel pod 120 and the tailgate 108 is shown to be secure in this position.

Additional structures for mounting bracket that facilitate quick and convenient assembly of a fuel system to a vehicle are discussed in US Pre-grant Publication No. 2014/0175783, which is hereby incorporated by reference in its entirety for all purposes. US Pre-grant Publication No. 2014/0175783 is also included herewith as an appendix.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments.

For purposes of this disclosure, certain aspects, advantages, and novel features are described herein. It is to be understood that not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Moreover, while illustrative embodiments have been described herein, the scope of any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to the examples described in the present specification or during the prosecution of the application, which examples are to be construed as non-exclusive. Further, the actions of the disclosed processes and methods may be modified in any manner, including by reordering actions and/or inserting additional actions and/or deleting actions. It is intended, therefore, that the specification and examples be considered as illustrative only, with a true scope and spirit being indicated by the claims and their full scope of equivalents.

Any methods disclosed herein need not be performed in the order recited. The methods disclosed herein include certain actions taken by a practitioner; however, they can also include any third-party instruction of those actions, either expressly or by implication.

What is claimed is:

1. A vehicle system comprising:
   a fuel system comprising at least one fuel tank, a conduit for providing fluid communication between the fuel tank and an engine of a vehicle, and a support frame coupled with and supporting the fuel tank and the conduit;
   a mounting structure configured to couple with a tailgate of a refuse truck, the mounting structure comprising a bracket having a concave portion having an open portion and a closed portion;
   the mounting structure further comprising a connection feature coupled with the support frame, the connection feature is configured such the connection feature can be lowered into the concave portion of the bracket;
   wherein the connection feature enables the fuel system to pivot about an axis thereof to cause the support frame to be aligned with the bracket of the mounting structure, wherein when so aligned apertures in the bracket and support frame are disposed about a common axis.

2. The vehicle system of claim 1, wherein the concave portion comprises a narrowing zone disposed at an elevation above a slot.

3. The vehicle system of claim 2, wherein the slot has a lateral dimension larger than the connection feature.

4. The vehicle system of claim 2, wherein the narrowing zone has a width that decreases from the open portion towards the slot.

5. The vehicle system of claim 2, wherein the slot is disposed between the narrowing zone and the closed portion.

6. The vehicle system of claim 1, wherein the mounting structure comprises a concave portion disposed on both sides of the fuel system, and further comprising a connection feature disposed on each side of the support frame, each connection feature configured to engage a corresponding concave portion.

7. The vehicle system of claim 1, wherein when the connection feature is disposed in the concave portion at least one degree of freedom of the fuel system relative to the vehicle chassis is restricted while allowing pivoting of the fuel system relative to the support frame.

8. The vehicle system of claim 1, wherein the connection feature comprises a concave portion configured to receive a portion of the mounting structure.

9. The vehicle system of claim 8, wherein the mounting structure comprises a cylindrical rod extending laterally of the bracket.

10. The vehicle system of claim 1, wherein the apertures are disposed at a separate location from the concave portion.

* * * * *

UNITED STATES PATENT AND TRADEMARK OFFICE
CERTIFICATE OF CORRECTION

PATENT NO. : 10,369,884 B2
APPLICATION NO. : 15/851416
DATED : August 6, 2019
INVENTOR(S) : Todd F. Sloan et al.

It is certified that error appears in the above-identified patent and that said Letters Patent is hereby corrected as shown below:

In the Specification

In Column 1, Line 64, change "such the" to --such that the--.

In the Claims

In Column 7, Line 27, Claim 1, change "such the" to --such that the--.

Signed and Sealed this
Twenty-sixth Day of November, 2019

Andrei Iancu
*Director of the United States Patent and Trademark Office*